(12) United States Patent
Sheets et al.

(10) Patent No.: US 12,446,767 B2
(45) Date of Patent: Oct. 21, 2025

(54) SYSTEMS AND METHODS FOR VISION AND EYE EVALUATION

(71) Applicant: Eyesight Mobile, Inc., Wilmington, DE (US)

(72) Inventors: John Sheets, Virginia Beach, VA (US); Steve Lee, Chicago, IL (US); Eduardo Montemayor, Chicago, IL (US); Isaac Sheets, Brisbane, CA (US); Michael Princi, Westford, MA (US)

(73) Assignee: EYESIGHT MOBILE, INC., Virginia Beach, VA (US)

( * ) Notice: Subject to any disclaimer, the term of this patent is extended or adjusted under 35 U.S.C. 154(b) by 838 days.

(21) Appl. No.: 17/571,988

(22) Filed: Jan. 10, 2022

(65) Prior Publication Data
US 2022/0218193 A1    Jul. 14, 2022

Related U.S. Application Data

(60) Provisional application No. 63/135,046, filed on Jan. 8, 2021.

(51) Int. Cl.
| | | |
|---|---|---|
| A61B 3/00 | (2006.01) | |
| A61B 3/12 | (2006.01) | |
| A61B 3/14 | (2006.01) | |
| A61B 3/16 | (2006.01) | |
| G06T 7/00 | (2017.01) | |
| G06T 7/20 | (2017.01) | |

(52) U.S. Cl.
CPC ............ *A61B 3/005* (2013.01); *A61B 3/0025* (2013.01); *A61B 3/1208* (2013.01); *A61B 3/14* (2013.01); *A61B 3/165* (2013.01); *G06T 7/0012* (2013.01); *G06T 7/20* (2013.01); *G06T 2207/30041* (2013.01)

(58) Field of Classification Search
CPC ......... A61B 3/0025; A61B 3/005; A61B 3/02; A61B 3/024; A61B 3/1208; A61B 3/14; A61B 3/165; G06T 7/0012; G06T 7/20; G06T 2207/30041
See application file for complete search history.

*Primary Examiner* — Jack Dinh
(74) *Attorney, Agent, or Firm* — Thomas C. Saitta (57) ABSTRACT

Systems and methods are disclosed for facilitating the evaluation of eye health and vision. The system is a mobile system and comprises at least one diagnostic device for performing a vision diagnostic test, the device being a VR headset; a portable computer communicatively coupled to the at least one diagnostic device, the computer having hardware adapted to guide a patient through the test, to compile test data, and to transmit the test data via a data connection; and a server in communication with the computer via the data connection, the server gathering the test data and presenting test data to a physician so that treatment may be provided to the patient. The at least one diagnostic device may include multiple portable, handheld diagnostic devices.

4 Claims, 11 Drawing Sheets

SYSTEMS AND METHODS FOR VISION AND EYE EVALUATION

FIELD AND BACKGROUND

The present disclosure pertains to eye and vision care and more specifically pertains to systems and methods for evaluating vision and eye health. More specifically, the disclosure relates to such systems and methods which utilize portable, handheld instruments in combination with a VR (Virtual Reality) headset, all of which are in communication with a portable computer in communication with a remote server, such that extensive diagnostics can be performed on a patient at remote locations.

The eye and vision care industry is largely based on the model of patients visiting the offices of optometrists and ophthalmologists in order to have access to diagnostic and care options. This leads to inefficiencies, including the inconvenience and disruption caused by the patient having to travel to and enter an office. Retaining office facilities and purchasing or leasing fixed diagnostic equipment and instrumentation involves significant expense as well. Prior attempts to provide for mobile diagnostics utilizing portable computers and/or smartphone devices have been found lacking due to the limitations in the display abilities of the portable computer and smartphone devices.

There exists a need for easier, faster and lower cost systems of evaluating eye and vision health. There is a need for such systems which comprise fully portable, mobile assemblies, collections or kits of handheld vision and eye evaluation instruments. There is a need to provide such systems which are capable of operating though portable computers and remote servers for two-communication between a patient and onsite technician located at one location and remote eye care professionals at a different location. There is a need to provide such systems wherein results from diagnostic tests can be transmitted for evaluation and analysis by software and/or remote eye care professionals, and further wherein treatment recommendations and educational information can be provided directly to the patient.

SUMMARY

A system according to one embodiment of the present invention comprises at least one diagnostic device for performing a vision diagnostic test, the at least one diagnostic device comprising a VR headset, a portable computer operated by an onsite technician, such as a laptop or pad; said portable computer communicatively coupled to the at least one diagnostic device, said computer having hardware adapted to guide a patient through the test, to compile test data, and to transmit the test data via a data connection; and a server in communication with the computer via the data connection, said server gathering said test data and presenting test data to an eye care professional, such as a physician, so that treatment, information and/or recommendations may be provided to the patient. The at least one diagnostic device and the computer are provided in a portable, handheld form capable of being transported to a site of the patient. In addition to the VR headset, the at least one diagnostic devices may comprise additional portable handheld devices such as for example fundus cameras, instruments for tonometry, pachymetry and b-scan biomicroscopy, and corneal curvature measurement.

DETAILED DESCRIPTION

Figure 1:
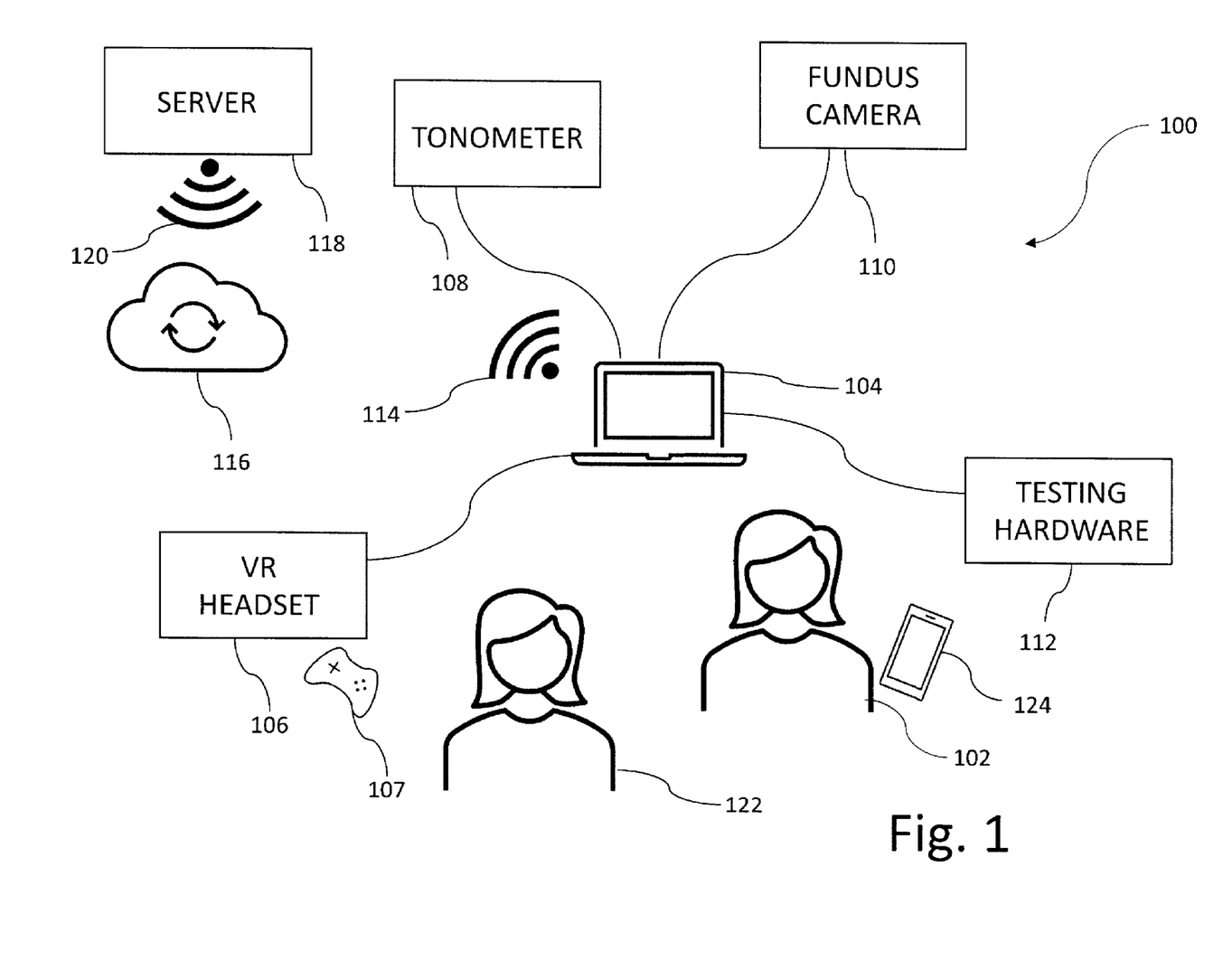
FIG. 1 is a diagram of an eye and vision evaluation system according to one embodiment of the present invention.

Systems and methods of the present invention provide for flexible eye and vision evaluation options. As shown in FIG. 1, an evaluation system 100 is designed to evaluate the vision and eye health of a patient 102. The evaluation system 100 comprises a portable computer 104, such as a laptop, pad or cellphone, to which a number of diagnostic devices 106, 108, 110, 112 are attached, either simultaneously or sequentially. The embodiment of FIG. 1 shows the diagnostic devices 106, 108, 110, 112 connected directly to the computer 104, but it is to be understood that in other embodiments, the diagnostic devices 106, 108, 110, 112 may be connected to an intermediary hub or other aggregating device, which in turn is connected to the computer 104. The embodiment of FIG. 1 shows wired connections between the computer 104 and the diagnostic devices 106, 108, 110, 112 (for example, data may be transferred via USB or Ethernet). In some embodiments, wireless connections (such as Bluetooth connections or WiFi connections) may be used to enable communication between the computer 104 and the diagnostic devices 106, 108, 110, 112.

The system 100 comprises at least one diagnostic device 106 required to be a VR (Virtual Reality) headset ca[able of audio and visual communication with external devices. Other diagnostic devices shown in in FIG. 1 include a tonometer 108 and a fundus camera 110. Additional or alternative diagnostic devices may be used in some embodiments of the present invention, as indicated by the block 112. Examples of additional devices that could be employed in some embodiments of the present invention may include but are not limited to devices that enable testing of contrast sensitivity, color vision testing, night vision testing, ophthalmologic ultrasound devices (both A and B scans), optical biometry, corneal topography, potential acuity, contrast sensitivity, Terry keratometry, wavefront analysis, visual acuity, pupil exam, ophthalmoscopy, slit-lamp exam, visual field testing, color vision testing, tonometry, fluorescein or indocyanine green angiography, electroretinography, ultrasonography, pachymetry, optical coherence tomography, computed tomography and magnetic resonance imaging and motion-based testing hardware. Separate hardware for tests, including perimetry testing for example, may also be provided. In some embodiments of the present invention, general health screening and/or diagnostic tools, such as sphygmomanometers, body temperature and/or heart rate measurement devices, portable EEG devices, scales, and the like may be incorporated and utilized, either instead of or in addition to the vision and eye testing. Diagnostic devices for use with embodiments of the present invention may include devices used for pre- and post-operative evaluation as well as devices used for routine eye and vision evaluation and diagnostic use. Because the system 100 is software controlled, the various diagnostic devices 106, 108, 110, 112 are interchangeable as parts of the system 100, as only the VR headset 106 is a required component. The system 100 is therefore an open system adaptable as desired. Likewise, software controls the manner of diagnostic testing, analysis of the results, delivery of treatment and information to the patient, etc.

The VR headset 106 may be provided with hardware and/or software to perform perimetry testing, in which the visual field of the patient 102 and the patient's peripheral vision are evaluated. A controller 107, such as a wireless controller, for use in one or both hands may be provided to enable the patient 102 to interact with the VR headset 106. The VR headset 106 may also be used to evaluate visual acuity and other characteristics of the patient's eyes and vision.

The tonometer 108 is a device that determines interocular pressure.

The fundus camera 110 is used for imaging the retina of the eye. In some embodiments of the present invention, the fundus camera 110 is used to capture retina images, which are forwarded to and evaluated by eye care professionals (such as ophthalmologists), so that existing or developing conditions related to retina health can be diagnosed.

The portable computer 104 is most preferably provided with internet or other network connectivity such as WiFi connectivity as shown at 114. The computer can thereby communicate with cloud-based services 116, including for example one or more servers 118 which may also be provided with the capability to communicate via WiFi as shown at 120.

The patient 102 may interact directly with the computer 104 and the diagnostic devices in some circumstances, but most preferably this interaction is facilitated by an assistant or technician 122 who is familiar with the operation of the computer 104 and the diagnostic devices.

In some embodiments of the present invention, one or more mobile devices 124 may be used in conjunction with or instead of one or more elements of the system hardware. For example, some or all of the data gathering and organizing functions of the computer 104 may be performed using the mobile device 124. In some embodiments of the present invention, the mobile device 124 may be used to perform some tests, and modifications may be made to the mobile device in order to enable this functionality.

The hardware including the computer 104 and the handheld diagnostic devices 106, 108, 110, 112 are packageable into a small and easy-to-carry form so that the evaluation system 100 can be easily transported, set up, and repackaged for transportation again. This enables the evaluation system 100 to be carried to homes or other sites so that testing and evaluation according to some embodiments of the present invention may be accomplished without requiring patients or eye care caregivers to be at particular locations.

Figure 2:
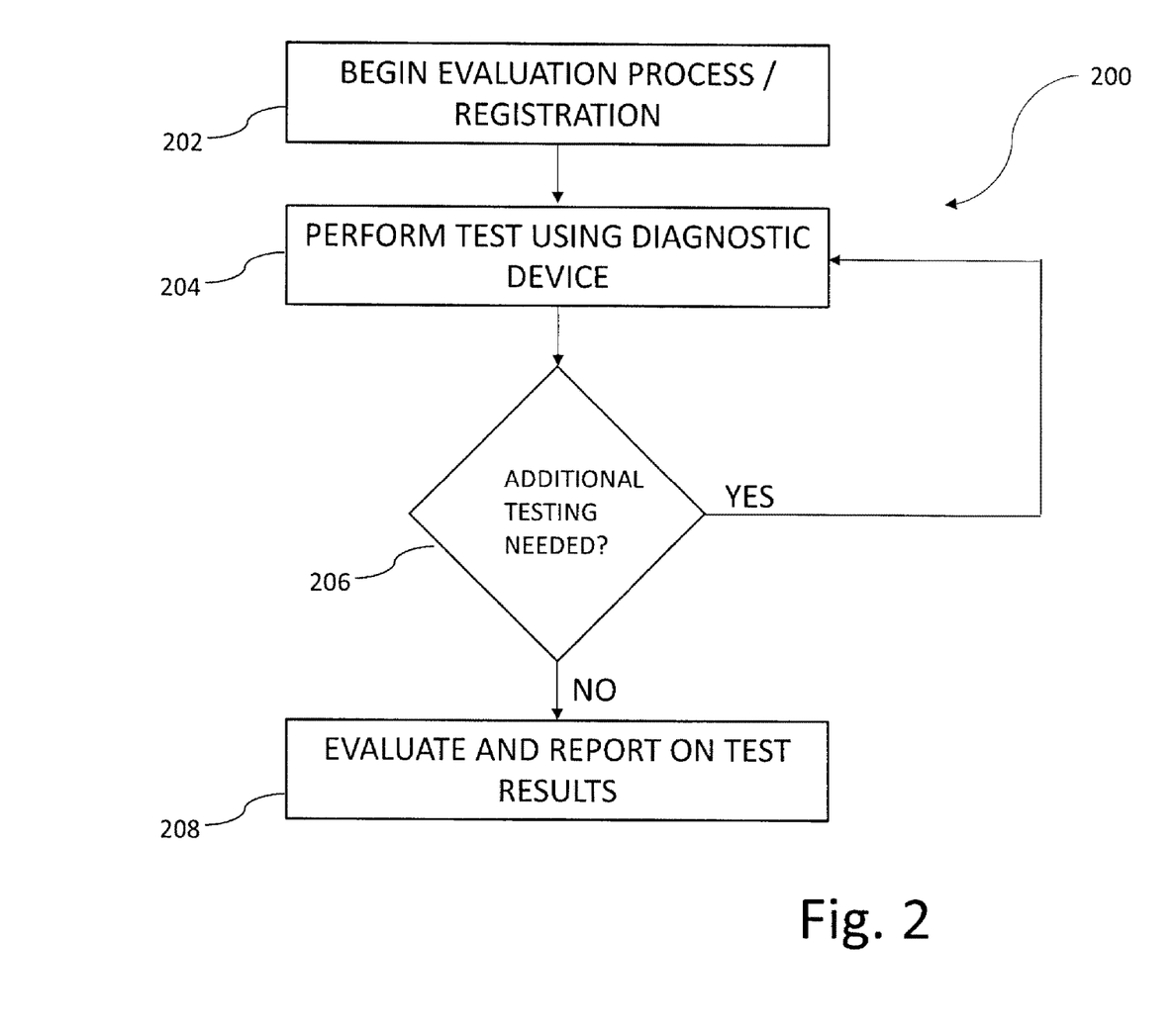
FIG. 2 is a block diagram of a process for using an eye and vision evaluation system according to one embodiment of the present invention.

Turning to FIG. 2, a basic process 200 of use of the evaluation system 100 of FIG. 1 is shown. An evaluation process is begun as shown at block 202, which may include a registration process for the patient 102. During this process, details such as general medical history details and eyesight and eye health details may be acquired, using the mobile computer 104. Following the registration and initiation of the process, a test is performed using the VR headset diagnostic device 106 as shown at block 204. The process then proceeds to determine if additional testing is needed as shown at block 206. If additional testing is needed, more testing is performed as shown at block 204. If no more testing is needed, the test results are evaluated and reported on as shown at block 208. This may include providing the report to a remote eye care professional via cloud services 116 (as shown in FIG. 1). In addition to communicating the individual diagnostic test data to the eye care professional, the system may also analyze the discrete result and compare to past values or to population values to provide the eye care professional with diagnostic insights. These analyses may be the result of available algorithms, or inherent artificial intelligence and/or machine learning capabilities and other software which are embedded in the Cloud or other system locations. These analyses are designed to facilitate diagnoses and ensure appropriate treatments.

In some embodiments of the present invention, a single diagnostic device may be used to perform more than one test. For example, the VR headset 106 may be used to perform a perimetry test, and also to perform visual acuity testing. This is accounted for in the process 200, as the evaluation of additional testing as shown at block 206 may include a determination of whether the same diagnostic device should be used to re-perform a previously administered test or to perform a new, different test.

Figure 3A:
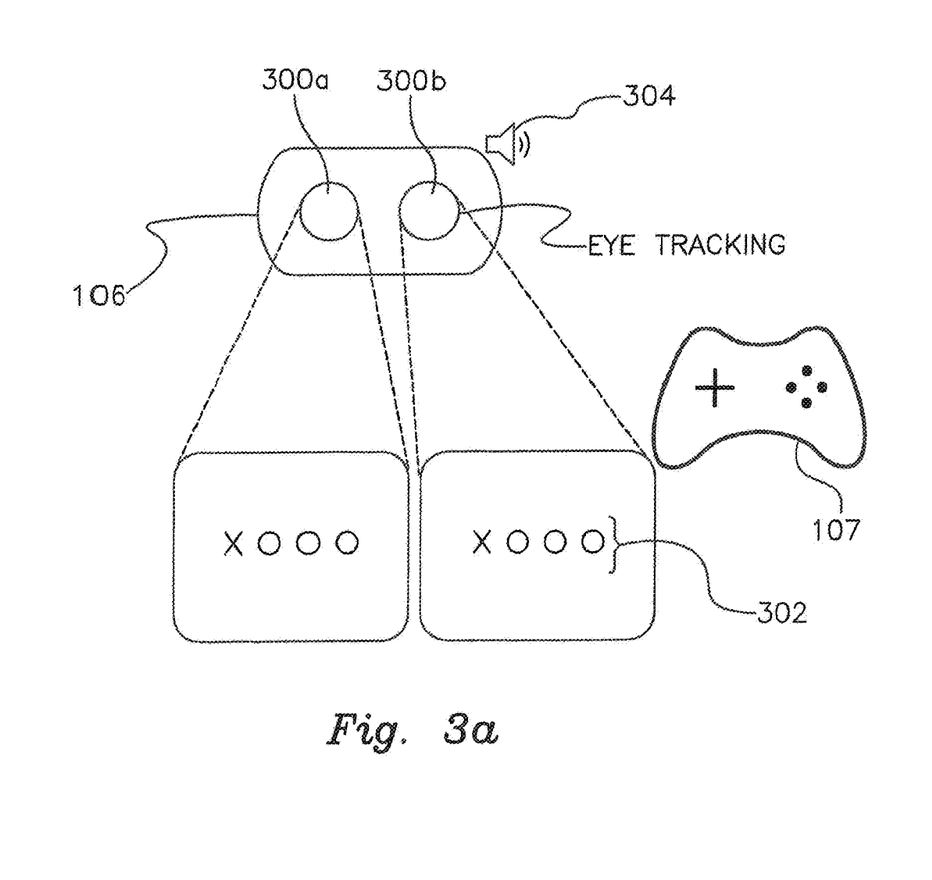
FIG. 3a is a diagram of a VR headset and controller according to one embodiment of the present invention.

FIG. 3a shows a VR headset 106 for use in some embodiments of the present invention. The VR headset 106 comprises two lenses 300a and 300b which the patient 102 can look through as part of a vision and eye evaluation process. One or more eye-facing camera or sensors 306 may be provided within the VR headset 106, allowing the measurement of certain qualities of the eyes and eye surfaces, including orientation. Optotypes 302 may be used to help in the evaluation of visual acuity. A handheld controller 107 for use in one or two hands may be used by the patient 102 in interacting with the VR headset 106, and audio commands as indicated at 304 may be given by the VR headset 106 in order to facilitate certain functions.

Figure 3B:
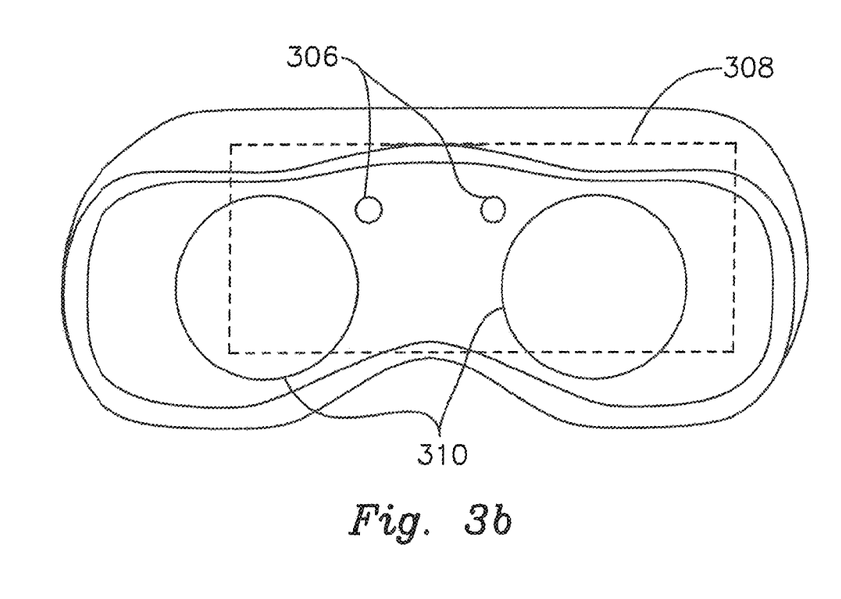
FIG. 3b is a perspective view of a VR headset according to one embodiment of the present invention.

FIG. 3b shows a more detailed view of the VR headset 106. Visible in FIG. 3b are eye-tracking cameras or sensors 306 which may be used to detect the direction of the patient's gaze for each eye, either to monitor motion or to insure that a steady gaze at a fixed location is maintained. A display 308 within the VR headset 106 is viewed through lenses 310. Mounting points may be provided within the VR headset 106 to allow example corrective lenses to be clipped into the VR headset 106 or otherwise held in place, so that the patient can see the likely effects of potential corrective lens options.

Figure 3C:
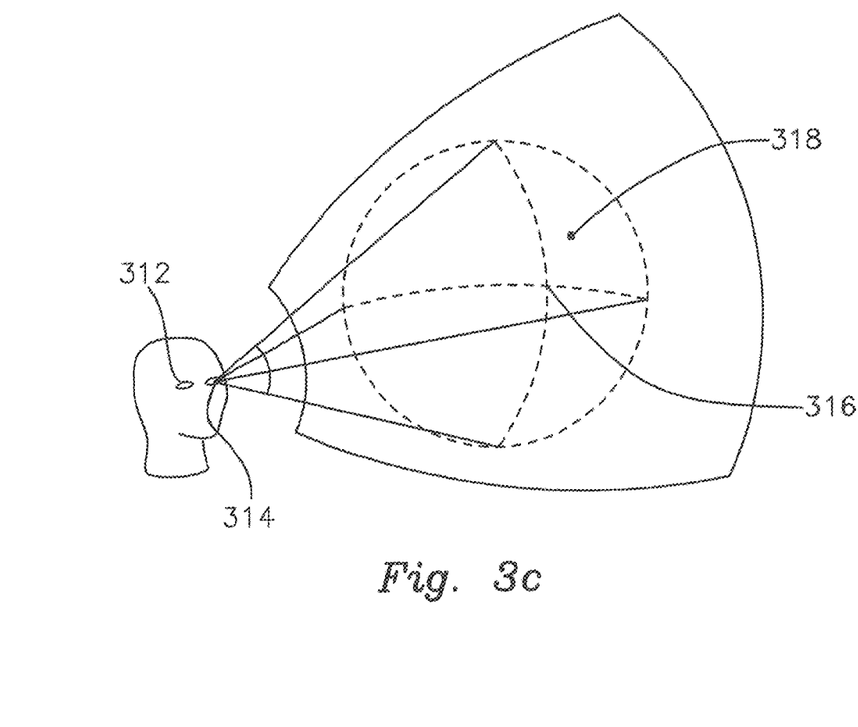
FIG. 3c is an illustration of a perimetry test according to one embodiment of the present invention.

FIG. 3c shows a view of a perimetry test as conducted with a VR headset 106. Perimetry measurement can be difficult because of the ability of the patient to look in different directions. In this function, the eye-tracking sensors 306 provided within the VR headset 106 track the eyeball. In some embodiments, the eye-tracking sensors 306 may work with an infrared illuminator. An algorithm can be used to detect the orientation of the eyeball and the iris of the eye. By incorporating this orientation information, the VR headset 106 is capable of making more precise measurements of perimetry.

In an example of a perimetry measurement as shown in FIG. 3c, the patient has a closed eye 312 and an open eye 314. Through the open eye, the patient fixes their gaze on a fixation visual point 316. A number of stimulus visual 318 points may be shown, or the stimulus visual point 318 may be moved around within on the display 308 of the VR headset 106. The angle of the patient's vision tested 320 can be changed depending on the exam type. Input from the patient may be made by speaking, or in some embodiments may be made by the patient giving feedback by a UI device such as the handheld controller 107.

Figure 4:
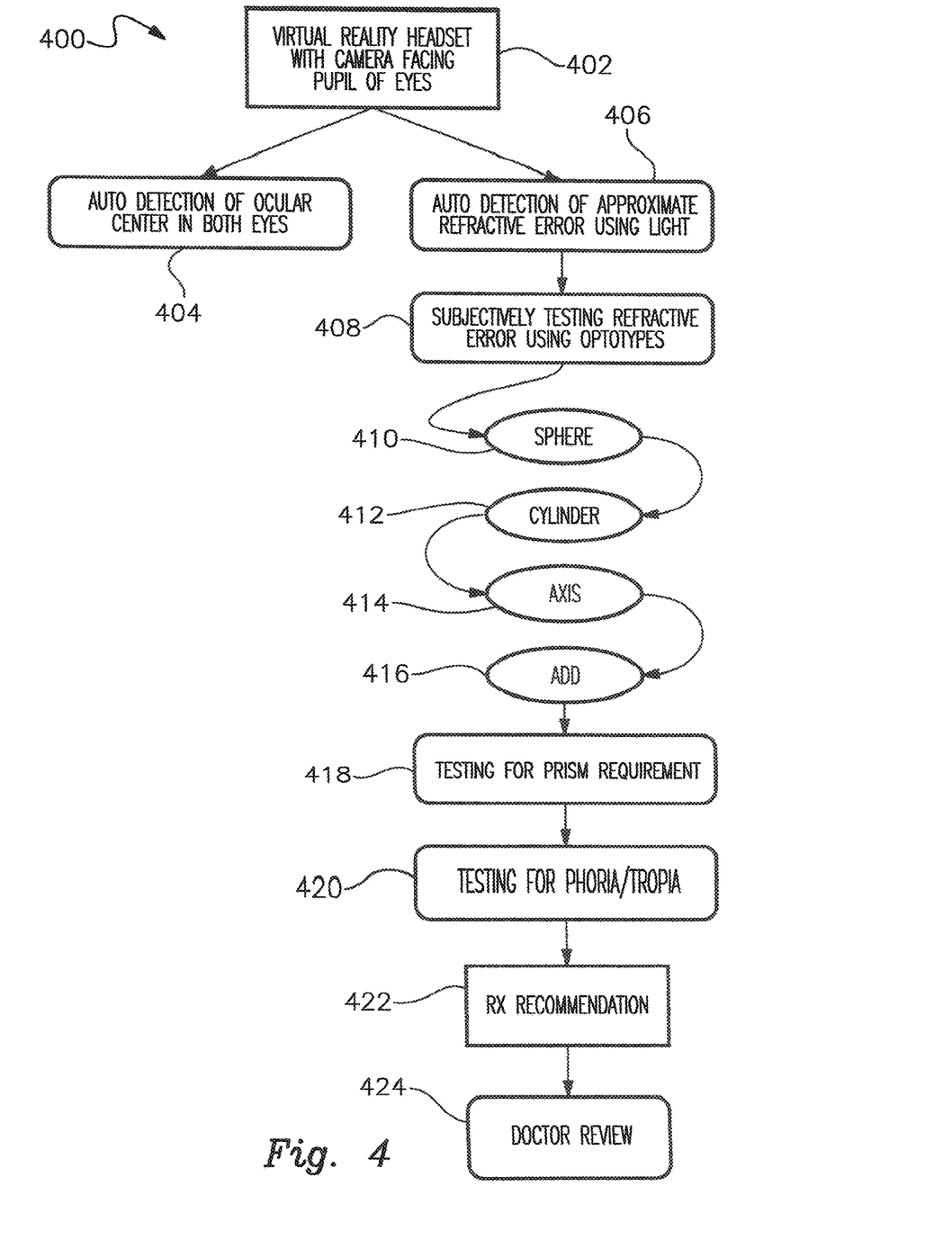
FIG. 4 is a block diagram showing a process for vision testing according to one embodiment of the present invention.

FIG. 4 is a flow diagram illustrating steps involved in a process 400 using the VR headset 106 in some embodiments of the present invention. As shown at block 402, the VR headset 106 is set up with eye-facing cameras 306 facing the pupils of a patient's eyes. As shown at block 404, detection can be performed in order to determine the ocular center in both eyes. In this step, the eye-facing camera(s) 306 of the VR headset 106 can be used to automatically determine how far the central positions of the eyes are from each other. This is useful for determining pupillary distance, a requirement when a lab grinds a pair of glasses.

As shown at block 406, auto-detection of each eye's approximate refractive error can be performed using light. In one embodiment of this test, light as a streak is shown from side to side in each eye (for example, from left to right), and the reflection of this light is captured using the eye-facing camera(s). This can provide a determination as to whether a person is near- or farsighted and approximately how strong their corrective lens prescription is or should be.

As shown at block 408, refractive error can be tested subjectively using optotypes. In this test, optotypes are displayed to each eye individually to determine refractive error based on the patient's subjective responses to visual stimuli. Algorithms can be used to determine the effects of these stimuli and thereby whether power should be added to a patient's corrective lens prescription.

As shown at 410-416, sphere, cylinder, axis, and add tests can be performed to assess the patient's eyesight. The sphere test 410 is used to determine how near- or farsighted the patient is. The cylinder test 412 is used to determine how much astigmatism the patient has. The axis test 414 is used to determine the direction of the patient's astigmatism, and the add test 416 is used to determine how much reading power the patient needs to see clearly for up-close vision when the patient is 40 years of age or older.

As shown at block 418, testing for a prism requirement is performed. In one embodiments of this test, a set of lines are displayed via the VR headset 106, with the image shown to the left eye differing slightly from the image shown to the right eye. This test is used in order to determine if the eyes are viewing images as a team, or if there is misalignment, which requires a prism correction on a corrective lens prescription.

Testing for phoria/tropia is performed, as shown at block 420. In this test, the magnitude of eye misalignment is determined and documented. In some embodiments of these tests, one or more inside the VR headset 106 focus on the subjects eyes, and while asking the patient to focus on various items on the digital screen (dots or objects), the position of the eyes from the midline of their face is measured and determined.

As shown at block 422, the results of the testing are compiled into a prescription recommendation and transmitted to a doctor, who reviews the test results and prescription as shown at block 424. This transmission can be done via remote transmission such as via cloud services 116 as shown in FIG. 1, and thus the doctor can be remote from the patient and the testing process while retaining the ability to review test results and to approve an accurate corrective lens prescription for the patient. In some embodiments of the present invention, the patient may be guided through the steps described herein via sound prompts, and may select options during the test using a controller 107.

Figure 5:
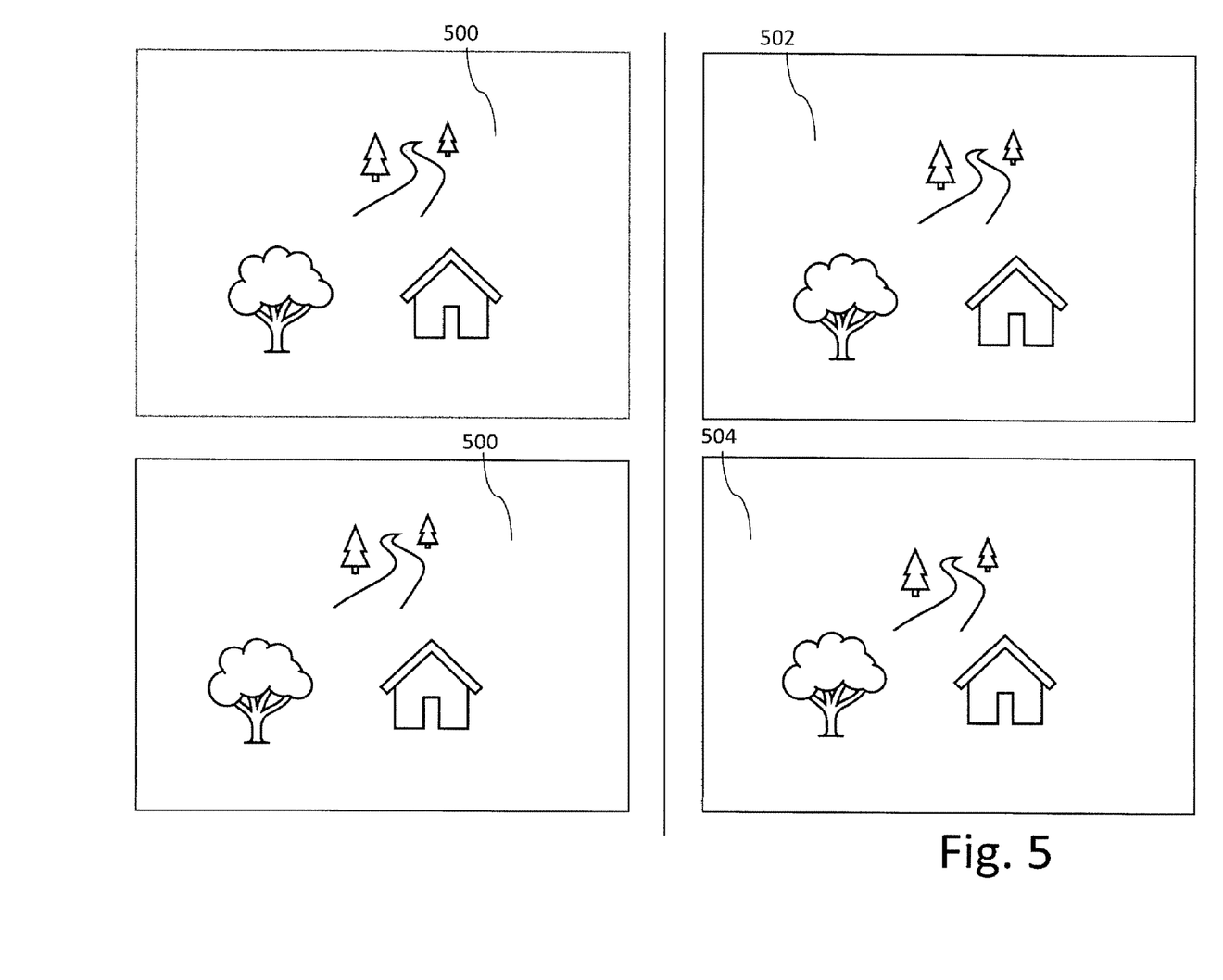
FIG. 5 shows images used in the portrayal of simulated corrective results as used in one embodiment of the present invention.

In some embodiments of the present invention, the VR headset 106 may be used to simulate for the patient 102 the results of certain corrective lenses or procedures. FIG. 5 shows images as displayed within a VR simulation in which such different results may be presented to the patient 102. In beginning image 500, the patient 102 is presented with a standard scene. In this example, the patient has an astigmatism, and thus the beginning image shows a certain amount of blurriness in the image elements due to the patient's inherent vision problem.

Next, the patient can be shown a simulated improved-eyesight image 502 in which a simulated correction is shown to the patient. For example, this image can demonstrate the effect of a treatment (such as surgery, including Lasik surgery), or of a particular corrective lens such as eyeglasses, contacts, or intraocular lenses (IOL). In some embodiments, effects of various settings of a modifiable electronic IOL can be simulated.

The patient can be shown the difference between two treatments or corrective lenses, for example by re-displaying the beginning image 500 followed by an additional simulated improved-eyesight image 504. For example, a simulated improved-eyesight image may show more elements in focus (greater depth of field), or better focus for some visual elements of the image, depending on the treatment and/or lens being simulated. In some embodiments of the present invention, expected effects of basic treatment options may be shown in comparison to the expected effects of premium treatment options. In this way, the patient may see the expected effects of different lenses and treatments and make an informed selection from different treatment or corrective lens options, given a comparison of pricing of the options as compared to expected improvement in visual acuity.

A combination of images and sound prompts from the VR headset 106 may be used to guide the patient through this process, and this process may involve the use of presentations using either 2D or 3D capabilities of the VR headset 106. Presentations may include stills shown within VR scenes that simulate anticipated effects of treatment and/or lens options.

Figure 6:
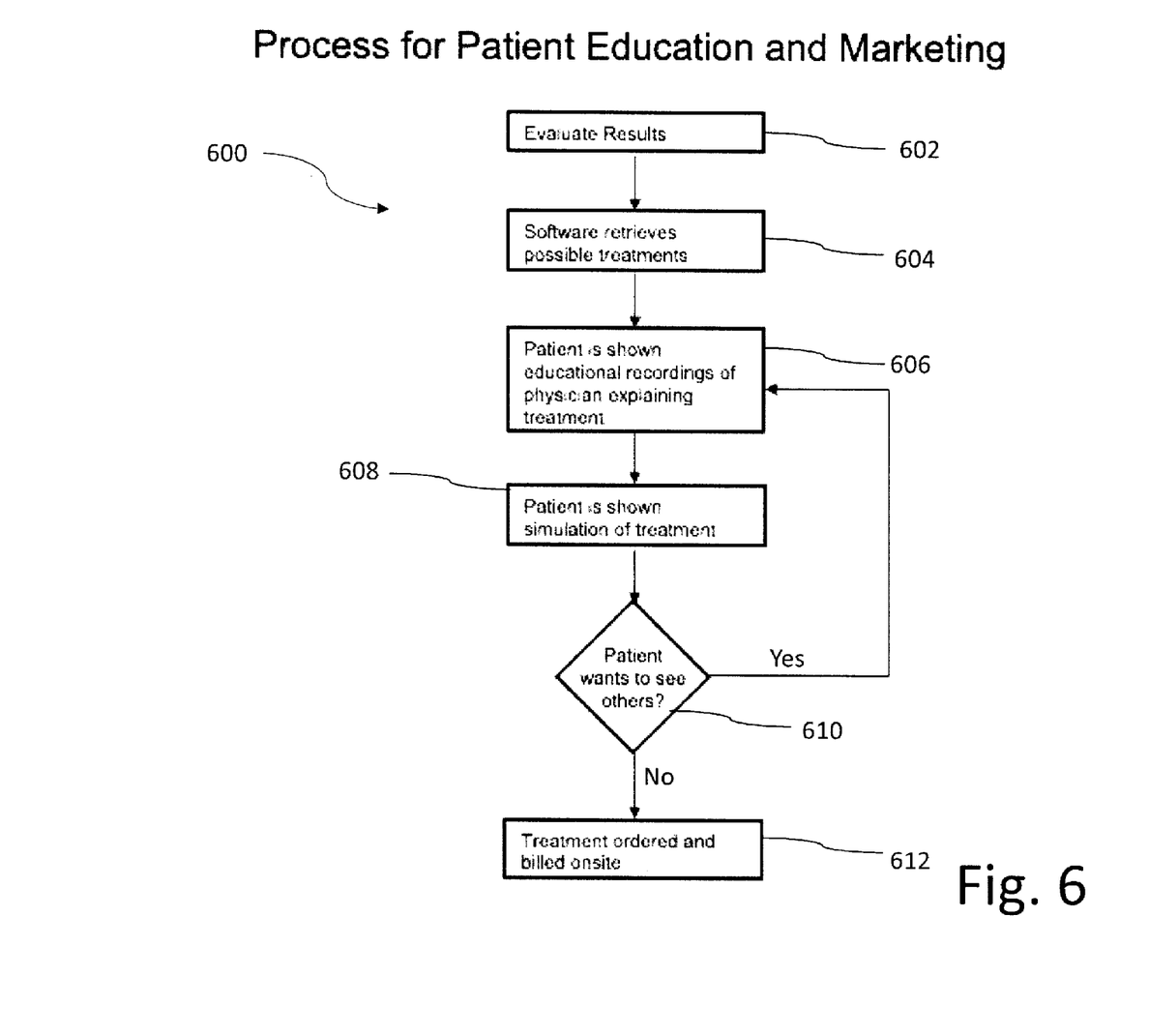
FIG. 6 is a block diagram illustrating a process for patient education and marketing according to one embodiment of the present invention.

FIG. 6 is a flow chart showing a process 600 for patient education and marketing as used in some embodiments of the present invention. Through processes in some embodiments of the present invention, a patient is shown and helped to understand: (a) the patient's condition; (b) possible treatments; (c) the improvements likely with basic treatment options; and (d) the improvements likely with more advanced treatment options. The more advanced treatment options may be more expensive than the basic treatment options, and the patient may be presented with information about difference in price and therapeutic effect. The patient should be provided with a balanced view of different options, with as much accuracy as reasonably possible.

As shown at block 602, this process begins with an evaluation of the results of diagnostic procedures. Software provided with the evaluation system 100 may be used to suggest possible treatments as shown at block 604. This step may be conducted by or with a physician or other eye care professional in alternative embodiments.

The patient may then be shown educational recordings of the patient's physician (or, for example, a sponsoring surgeon) explaining treatment options, as shown at block 606. The use of the VR system in the diagnostic regimen also presents an opportunity to use the exceptional audiovisual capabilities of modern VR headsets for patient education. This education can be used to provide the patient with education on their vision, their condition and treatment options. The dynamic high resolution controlled visual presentation capabilities can simulate both vision deterioration from disease and age and the enhancement and restoration from treatment options. All of these can assist in the patient making more informed decisions about their own treatment and will enhance outcomes. The essential requirement of medication compliance may be reinforced by this unique educational capability. In some embodiments, rather than recordings, the patient is put in real-time contact with the patient's physician or other eye care professional directly so that communication between the patient and the physician can take place as treatment options are discussed and compared. In some embodiments of the present invention, pre-recorded presentations that are customized to the individual patient may be presented. Presentations may be pre-recorded for different diagnoses and different potential treatments.

In some embodiments, if a patient is diagnosed with a condition that will likely get progressively worse, the patient may be shown images and/or presentations that simulate the progression of the condition, as compared to images and/or presentations that simulate the likely results of therapeutic approaches.

In some embodiments of the present invention, messages and/or presentations may be presented depending on the category of clinical results, and depending on the category of the results of the diagnostics of the portable system.

The patient may be shown simulations of treatments via the VR headset 106 or other display, as shown at block 608. These treatments may be customized for view in the VR headset 106, including 3D views, so that 3D effects of the suggested treatments (including suggested lenses) can be experienced by the patient in a VR simulation.

At block 610, it is determined whether the patient wants to see other potential lens or treatment options. If the patient wants to be provided with different options, the process returns to block 606, where other options may be described. If the patient does not wish to be provided with additional options, the process proceeds to block 612, which shows that a selected treatment may be ordered and billed.

Figure 7:
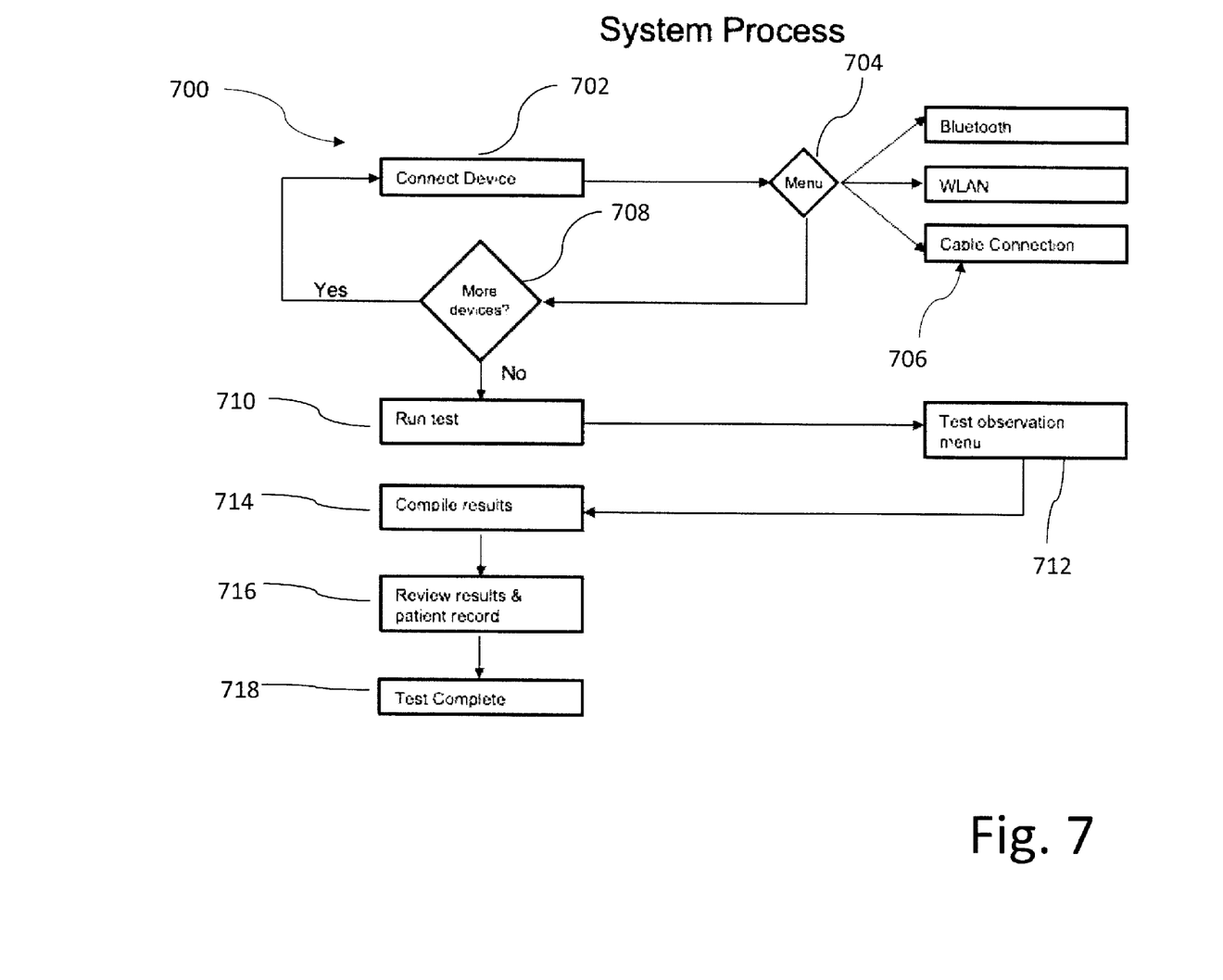
FIG. 7 is a block diagram illustrating a system setup and test process system setup and test process according to one embodiment of the present invention.

FIG. 7 is a block diagram showing a system setup and test process 700. The process may begin with device connection, with a user (who may be the patient) connecting a diagnostic device to a central unit such as the computer 104, as shown at block 702. A device connection menu may be presented to the user as shown at 704, and the user may select the type of connection from a list of connection types as shown at 706. In some embodiments, the device and connection type may be auto-recognized by the central unit.

As shown at 708, the user may be asked if other devices are to be connected. If yes, the process 700 returns to block 702 to allow additional devices to be connected. If no, the process proceeds to block 710, where a test is run. During the test a test observation menu may be displayed on the computer or other central unit 104, during which information about the test is conveyed, as shown at block 712. After one or more tests are run, results are compiled as shown at 714. The results and patient record may be reviewed by a technician, a physician, or both, as shown at 716, and then the test is complete as shown at block 718.

Figure 8:
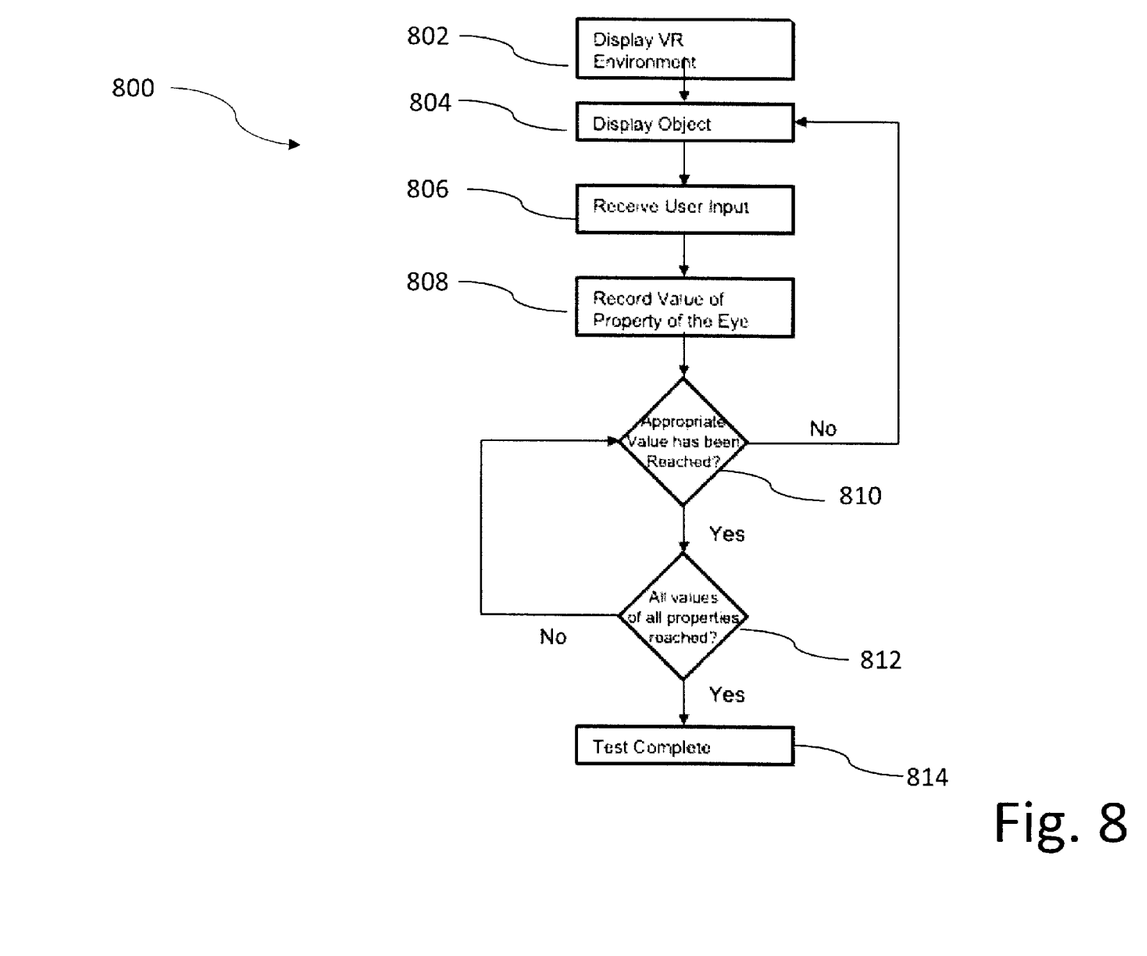
FIG. 8 is a block diagram illustrating the process of a vision or eye test according to some embodiments of the present invention.

FIG. 8 is a block diagram showing the process of a vision or eye test according to some embodiments of the present invention. The process 800 starts at block 802 with a display of a VR environment. An object is displayed within the VR environment as shown at block 804, and user input (such as patient input) is received regarding such object, as shown at block 806. For example, the user may give spoken information about whether the user can see the object, and whether the object is in focus. User input may be provided via the handheld controller 107 in some embodiments of the present invention. A value of a property of the eye that corresponds with the user feedback is recorded as shown at block 808. At block 810, it is determined whether an appropriate value (such as an appropriate amount of user feedback) has been received. If more or better information is needed, the process returns to block 804. If an appropriate value or set of values has been received, the process may then seek other feedback from the user. At block 812, if all values for all elements of a test have been received and recorded, the test completes as shown at 814. If additional values are needed, the process returns to block 810 and possibly back to block 804 if additional aspects of a test must be conducted. The process 800 will work with tests such as perimetry, refraction, and acuity tests, for example.

Figure 9:
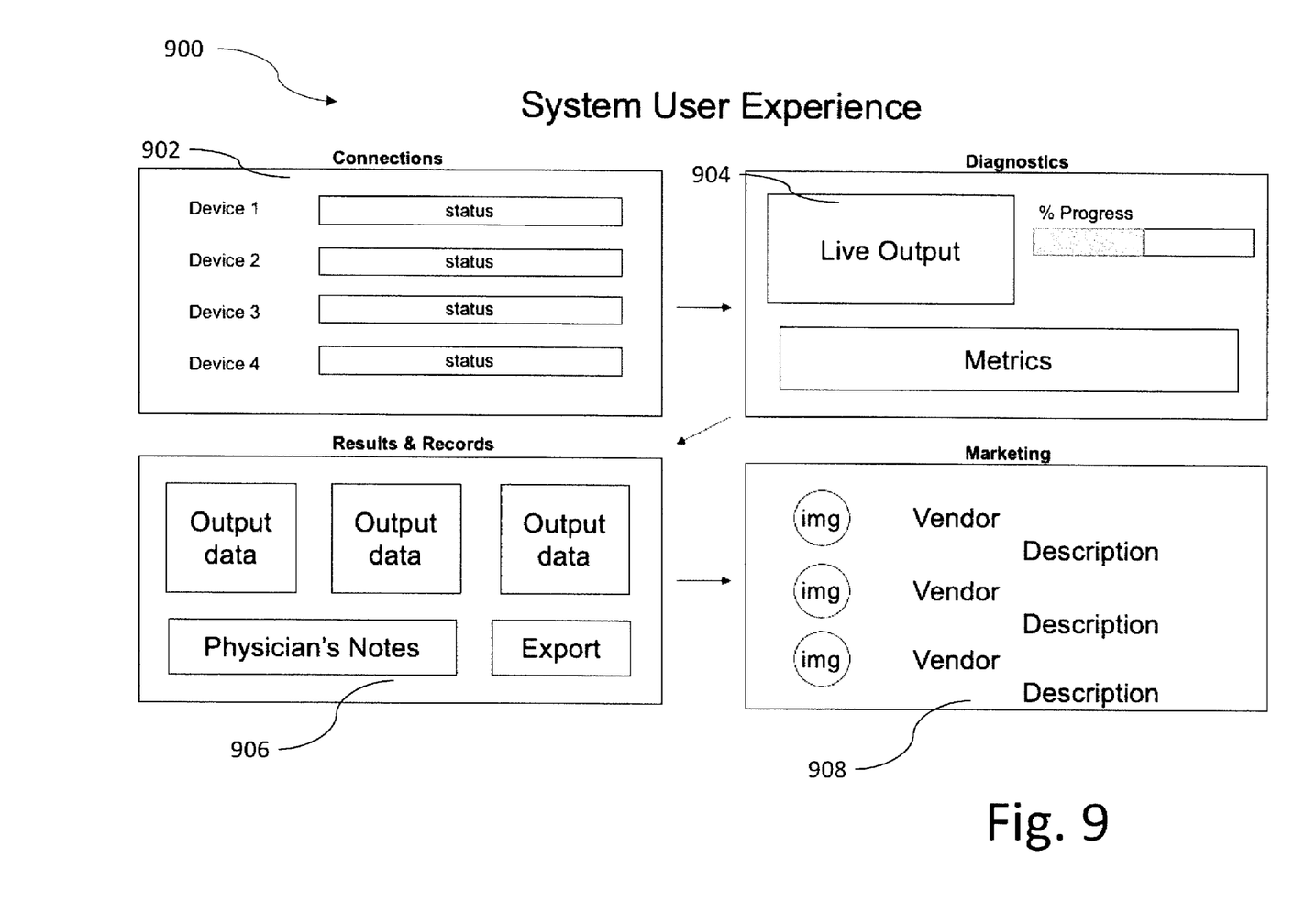
FIG. 9 is a diagram illustrating screen displays screen displays according to some embodiments of the present invention.

FIG. 9 shows screen displays that may be presented to a user, such as a patient or an assistant or physician, in a system user experience 900. These displays may be displayed by the computer 104. A connection display 902 shows the status of diagnostic device connections, with a separate status listed for each diagnostic device. A diagnostic display 904 shows the live output of a diagnostic process, the percentage of progress through a diagnostic process, and diagnostic metrics. A results and records display 906 shows information such as output data for several tests, physician's notes relating to the tests, and an "export" button allowing the patient diagnostic information to be exported to other systems. A marketing display 908 may be provided showing images of different treatment options (which may show the treatments themselves, or simulated results of treatments), along with vendor information and descriptions for each treatment option.

In some embodiments of the present invention, a mobile device, tablet, or laptop, collectively referred to as the computer 104, may execute software that receives information from the diagnostic devices, processes or combines it, possibly using the above described analytic methods, and provides a graphical user interface for the technician and/or physician to efficiently examine the results of the tests using the diagnostic devices, the measured properties of vision, other measured properties of health, and the results of the analytic methods. This software may also provide secure software-based interfaces, called application programming interfaces (APIs), both on the computer 104 and/or over the internet by connections described below, to other software necessary for the technician and/or physician to provide their services. The computer 104 may serve the role of a central unit for interfacing with other elements of the present invention.

In some embodiments of the invention, data comprised of a history of tests using the diagnostic devices of the invention, or data from the historical medical record of the patient, may be combined to produce useful metrics and analytics for a technician or assistant 122 during the use of the invention for the purposes of improving the measurement of properties of vision, or for producing useful metrics and analytics for the physician to aid in diagnostic and/or therapeutics decisions. These data sources may be combined to produce these metrics and/or analytics using simple equations and/or heuristics, or complex linear, multi-linear, and/or nonlinear statistical models, implemented in software executed on either the computer 104, or aforementioned server using secure communication protocols to protect patient privacy.

In some embodiments of the present invention, systems and methods may allow for the assessment of more than one property of vision, with the system comprising: a hardware device, such as a computer 104 or a mobile device, for executing software facilitating vision testing and evaluation; a head-mountable display 106 (such as a virtual reality headset) configured to render a virtual reality environment, and configured to communicate with the software. In some embodiments of the present invention, assessment of different properties of vision and eye health may be accomplished simultaneously.

The VR headset 106 is configured (either alone, or in combination with the computer or mobile device) to execute one or more of the following computer instructions: displaying a VR environment (environment, objects, with arbitrary properties); receiving user input; tracking movements of the eye via camera(s) facing pupils of eyes; recording a value, of at least one parameter, by user input or eye tracking sensor input or both, where the parameter is indicative of a perception of at least one property of at least one object by at least one eye of the user; determining whether an appropriate value of at least one parameter has been reached; and repeating the determination of whether an appropriate value of at least one parameter has been reached until appropriate values have been reached.

In some embodiments of the present invention, the VR headset 106 may create a new and distinct object with at least one new property that is different each time.

The software provided on the computer 104 or mobile device can record any and all data from one or more diagnostic devices, including but not limited to the VR headset 106.

In some embodiments, a computer or mobile device may be used to replicate or replace some of the functions described as being capabilities of the VR headset 106.

Systems and methods according to various embodiments of the present invention may be adapted for a variety of different evaluation purposes. For example, in some embodiments of the present invention, diagnostic devices for use in the evaluation of patients with respect to such things as mobility, balance, skin care, cardiovascular health, and strength may be employed. In some embodiments, a mobile device of a patient may be used to interact with the evaluation system 100.

This description refers to block diagrams and other accompanying drawings. Alternative implementations of the example represented by the block diagram may include one or more additional or alternative elements, processes and/or devices. Additionally or alternatively, one or more of the example blocks of the diagrams may be combined, divided, re-arranged or omitted. Components represented by blocks of the diagrams may be implemented by hardware, software, firmware, and/or any combination of hardware, software and/or firmware. In some examples, at least one of the components carrying out the functions described in the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

This description refers to various operations described herein and flowcharts that may be appended hereto to illustrate the flow of those operations. Although the blocks are illustrated in sequential order, the actions indicated by the blocks may in some embodiments be performed in parallel, and/or in a different order than those described herein. Also, the various blocks may be combined into fewer blocks, divided into additional blocks, and/or removed based upon the desired implementation. Also, the various blocks may be combined into fewer blocks, divided into additional blocks, and/or removed based upon the desired implementation. Any such flowcharts are representative of example methods disclosed herein. In some examples, the methods represented by the flowcharts may be implemented by the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a machine-readable medium) for execution by logic circuit(s).

The methods and systems discussed herein may be implemented via one or more mobile devices (e.g., a digital processor, a digital circuit designed to process information, an analog circuit designed to process information, a state machine, and/or other mechanisms for electronically processing information). The one or more mobile devices may include one or more devices executing some or all of the operations of the methods in response to instructions stored electronically on an electronic storage medium. The one or more mobile devices may include one or more devices configured through hardware, firmware, and/or software to be specifically designed for execution of one or more of the operations of the methods.

The server(s), client computing platform(s), and any other discussed third parties may be communicatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s), client computing platform(s), and any other discussed third parties may be operatively linked via some other communication media.

A given client computing platform may include one or more processors configured to execute computer program modules. The computer program modules may be configured to enable a user associated with the given client computing platform to interface with the described systems and methods and/or provide other functionality attributed herein to client computing platform(s). By way of non-limiting example, the given client computing platform may include one or more of a desktop computer, a laptop computer, a handheld computer, a tablet computing platform, a smartphone, and/or other computing platforms.

Server(s) may include electronic storage and one or more processors, and/or other components. Server(s) may include communication lines, or ports to enable the exchange of information with a Network and/or other computing platforms. Illustration of server(s) is not intended to be limiting. Server(s) may include a plurality of hardware, software, and/or firmware components operating together to provide the functionality attributed herein to server(s). For example, server(s) may be implemented by a cloud of computing platforms operating together as a server(s).

Electronic storage used in embodiments of the present invention may comprise non-transitory storage media that electronically stores information. The electronic storage media may include one or both of system storage that is provided integrally (i.e., substantially non-removable) with server(s) and/or removable storage that is removably connectable to server(s) via, for example, a port (e.g., a USB port, a firewire port, etc (or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private Network, and/or other virtual storage resources). The electronic storage may store software algorithms, information determined by processor(s), information received from server(s), information received from client computing platform(s), databases and/or other information that enables server(s) to function as described herein.

Processor(s) may be configured to provide information processing capabilities in server(s). As such, processor(s) may include one or more of a digital processor, an analog processor, a digital circuit designed to process information, an analog circuit designed to process information, a state machine, and/or other mechanisms for electronically processing information. Although processor(s) may function as a single entity, in other implementations, processor(s) may include a plurality of processing units. These processing units may be physically located within the same device, or processor(s) may represent processing functionality of a plurality of devices operating in coordination. Processor(s) may be configured to execute instructions for applications, or modules, by software; hardware; firmware; some combination of software, hardware, and/or firmware; and/or other mechanisms for configuring processing capabilities on processor(s). As used herein, the term "module" may refer to any component or set of components that perform the functionality attributed to the module. This may include one or more physical processors during execution of processor readable instructions, the processor readable instructions, circuitry, hardware, storage media, or any other components. The various messaging and data transfer described herein can be accomplished with APIs.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is understood that equivalents and substitutions for certain elements described above may be obvious to those of skill in the art, and therefore the true scope and definition of the invention is to be as set forth in the following claims.

What is claimed is:

1. A mobile vision and eye evaluation system comprising:
   at least one diagnostic device for performing a vision diagnostic test, said at least one diagnostic device comprising a VR headset capable of performing perimetry testing, visual acuity testing, prism requirement testing, and/or phoria/tropia testing, said VR headset comprising a camera or sensor monitoring eye movement of the patient;
   said at least one diagnostic device further comprising a diagnostic device chosen from the group of diagnostic devices consisting of a tonometer, a fundus camera, and devices that enables testing of contrast sensitivity, color vision testing, night vision testing, ophthalmologic ultrasound devices (both A and B scans), optical biometry, corneal topography, potential acuity, contrast sensitivity, Terry keratometry, wavefront analysis, visual acuity, pupil exam, ophthalmoscopy, slit-lamp exam, visual field testing, color vision testing, tonometry, fluorescein or indocyanine green angiography, electroretinography, ultrasonography, pachymetry, optical coherence tomography, computed tomography and magnetic resonance imaging and motion-based testing hardware;
   a portable computer communicatively coupled to the at least one diagnostic device, said computer having hardware adapted to guide a patient through the test, to compile test data, and to transmit the test data via a data connection; and
   a server in communication with the computer via the data connection, said server gathering said test data and presenting test data to an eye care professional at a location remote from the location of the patient such that treatment, educational information and recommendations may be provided to the patient, and wherein gathering said test data and presenting test data to an eye care professional includes analysis of said test data by artificial intelligence and/or machine learning software.

2. The system of claim 1, wherein said at least one diagnostic device comprises multiple, handheld, portable diagnostic devices.

3. The system of claim 1, wherein said portable computer is is adapted to be operated by a technician.

4. The system of claim 2, wherein said portable computer is adapted to be operated by a technician.

\* \* \* \* \*